Sept. 1, 1931.  T. F. SOVINE  1,821,362
ELECTRIC CONDUIT CONNECTER
Filed May 1, 1929
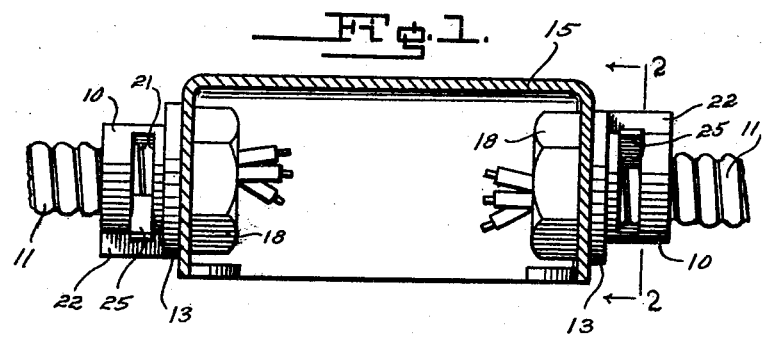
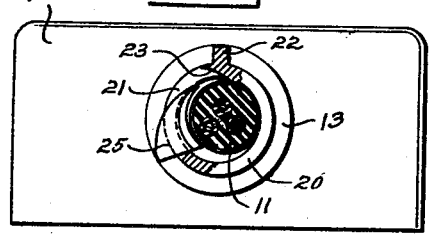 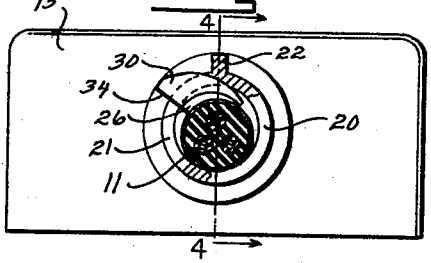
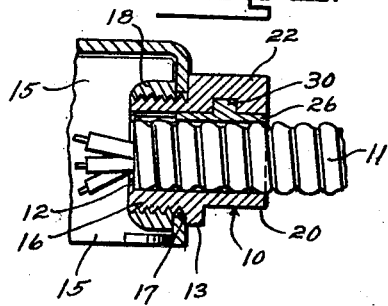 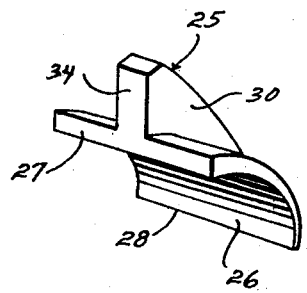
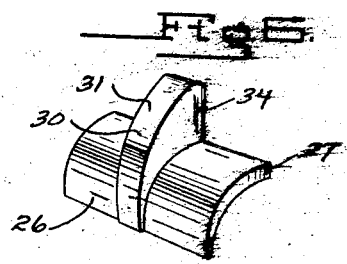
INVENTOR.
Tony F. Sovine
BY
ATTORNEYS.

Patented Sept. 1, 1931

1,821,362

UNITED STATES PATENT OFFICE

TONY F. SOVINE, OF FLINT, MICHIGAN

ELECTRIC CONDUIT CONNECTER

Application filed May 1, 1929. Serial No. 359,687.

The present invention relates to connecters for electric conduits and cables and more particularly to connecters for use in the installation of flexible armored conduits commonly known as B. X. cable, and also with "Greenfield" flexible conduits.

With the present type of connecters, the connecter is attached to the cable by means of a set screw which in some types acts to contract the connecter and squeeze the cable, while in other types the set screw is turned directly adjacent the cable resulting in injury to the cable. Greenfield flexible conduit consists of a metal armor wound around a core providing a tubular conduit thru which insulated wire may be drawn. This type of cable is very easily injured or damaged by forcing a screw or other sharp element against the conduit, which aside from collapsing the conduit tends to open the seams of the conduit so that the wire is damaged when drawn thru the conduit making the installation dangerous. The outside diameter of these types of connecters is also objectionable in many cases and often prevents proper connecting of the cable to the connecter. A further disadvantage with these types of connecters is that injury in quite often done the workman while holding the connecter in place thru slipping of the screw driver from the set screw.

It is therefore the primary object of the present invention to provide an improved connecter embodying locking means whereby a solid connection between the cable and connecter may be had without injury to the cable.

A further object of the invention is to provide a connecter having small outside diameter permitting all classes of work to be done in conformity with the National Underwriters' Code, and one which may be readily applied and removed without destroying the cable or the connecter.

A further object of the invention is to provide a two piece connecter which may be effectively applied to the cable thru use of a pair of pliers.

A further object of the invention is to provide a connecter embodying a circumferentially movable locking member for firm gripping engagement with the cable thru a cam action between the locking member and body portion of the connecter.

Other objects and advantages of the invention will be apparent during the course of the following detailed description, taken in connection with the accompanying drawings forming a part of this specification and in which drawings:

Figure 1 is a view showing the connecters in use for connecting ends of armored cables to an outlet box, the outlet box being shown in section.

Figure 2 is a section substantially on line 2—2 of Figure 1 and showing the clamping or locking member in a released position.

Figure 3 is a view substantially similar to Figure 2 but showing the clamping or locking member in an operative position for connecting the cable to the connecter.

Figure 4 is a section on line 4—4 of Figure 3.

Figure 5 is a perspective view looking at the inner side of the locking member.

Figure 6 is a perspective view looking at the outer side of the locking member.

While in the drawings the connecter has been shown associated with an outlet box, it will be readily apparent that the connecter will be found adaptable for use in connecting cables to panel boxes, switch boxes or any other type of outlet receptacle.

The improved connecter embodies a tubular body portion 10 into the outer end of which may be inserted the flexible armored cable 11. The inner end of the tubular body portion 10 may be provided with a shoulder 12 for limiting movement of the cable into the tubular body portion. The sleeve or body portion 10 is formed intermediate its ends with an external annular stop flange 13 for abutting against the outer wall of the box 15 when the threaded inner end 16 of the tube is inserted thru the opening 17. A suitable bushing or lock nut 18 may be threaded upon the threaded inner end 16 into engagement with the inner wall of the box 15 for coupling the connecter to the box. The plain outer portion 20 is provided substantially midway its ends with a segmental slot 21 terminating at one end adjacent a lug or rib 22 extending longitudinally of the sleeve from the stop flange 13 on the exterior of the portion 20. The forward end of the slot 21 adjacent the rib 22 is beveled as at 23 forming a cam surface for co-acting with the locking member generally designated by the numeral 25.

The clamping or locking member 25 embodies an arcuate shaped wedge plate 26 which preferably tapers from the rear edge 27 to the front or leading edge 28. Formed integral with the arcuate wedge plate 26 preferably midway the ends thereof and at the convex side thereof is a cam block 30 having a cam face 31 the low side of which nearly converges into the convex surface of the wedge plate 26 at its leading edge 28. The high end of the cam block 30 has its end face 34 extending flush with the rear edge 27 of the wedge plate 26. The cam block 30 is of a thickness equal to the width of the arcuate slot 21, and the high end of the cam block is of such height as to project beyond the circumference of the sleeve portion 20 when the locking member is in engagement with the cable 11 with the cam block fitting in the slot 21. The concave side of the arcuate wedge plate 26 is preferably struck on a smaller arc than the radius of the opening thru the sleeve 10.

In locking an end of the cable 11 in the connecter, the locking member may be moved to the rear end of the slot 21 as in Figure 2 which allows the wedge plate 26 to engage the bore of the sleeve 10 and allow sufficient room for insertion of the cable into the sleeve. The locking member may then be shifted in a direction circumferentially of the sleeve toward the lug 22 and then by placing a pair of pliers so that one jaw engages behind the lug 22 and the other jaw the end face 34 of the cam block 30, the locking member may be forcibly moved by closing the pliers. During this movement, the cam face 31 will act upon the cam surface 23 in such manner as to move the arcuate wedge plate 26 in a direction diametrically of the sleeve 10 and firmly clamp the cable between the wedge plate and inner surface of the sleeve. As will be observed, the arcuate wedge plate 26 conforms to and engages a substantial portion of the cable armor so that there is little likelihood of collapsing or injuring the cable thru the clamping action. The gripping action upon the cable is readily released thru movement of the locking member in a direction away from the lug 22.

By observing Figures 1 and 2 it will be seen that the outside dimension of the connecter will be relatively small and thus allow for use of the connecter where space is limited. In Figure 4 it will be observed that the arcuate wedge plate engages a substantial portion of the metal armor of the conduit and so distributes pressure upon the armor as to prevent likelihood of collapsing the same.

From the foregoing it will be apparent that an improved construction for electric conduit connecters has been provided whereby a solid and firm connection of the cable may be had without injury to the cable. It will also be apparent that a construction has been provided allowing for use of the connecter in a relatively small space, and one wherein the clamping action upon the cable may be accomplished thru use of a pair of pliers acting to forcibly shift a clamping member circumferentially in the body of the connecter into firm gripping engagement with the cable.

Changes in detail may be made to the form of invention herein shown and described, without departing from the spirit of the invention or the scope of the following claims.

I claim:

1. In an electric conduit connecter, a tubular body portion, and a clamping member including an arcuate wedge plate movable circumferentially within the tubular body and a cam block projecting laterally of the body portion for moving the wedge plate inwardly when the clamping member is moved circumferentially of the body portion.

2. In an electric conduit connecter, a tubular body portion having a segmental circumferentially extending slot, and a clamping member including an arcuate wedge plate arranged inwardly of the tubular body and a cam block projecting thru said slot and having a cam action with one end of the slot for moving the wedge plate inwardly when the clamping member is moved circumferentially of the tubular body portion.

3. In an electric conduit connecter, a tubular body portion provided with a segmental circumferentially extending slot having a cam surface at one end, and a clamping member including an arcuate wedge plate arranged inwardly of the tubular body and a cam block projecting thru the slot and having a cam face co-acting with the cam surface for moving the wedge plate inwardly when the clamping member is moved circumferentially of the tubular body portion.

4. An electric conduit connecter including a tubular body portion provided with a segmental circumferentially extending slot having a cam surface at its forward end, and a clamping member including an arcuate wedge plate and a cam block midway the ends of the plate movable in said slot and having a cam face for engagement with the cam surface at one end of the slot, said cam block at its high end being of greater thickness than the thickness of the wall of the tubular body portion and projecting beyond the circumference of the tubular body portion.

5. In an electric conduit connecter, a tubular body portion provided with a segmental circumferentially extending slot, and a clamping member including an arcuate wedge plate having a radius less than the radius of the bore thru the tubular body and a cam block projecting from the convex side of the wedge plate and thru said slot beyond the circumference of the tubular body portion when the wedge plate is in engagement with the end of a piece of conduit inserted into the tubular body portion.

6. An electric conduit connecter including a tubular body portion provided with a segmental circumferentially extending slot, and a clamping member including an arcuate wedge plate for fitting in the bore of the tubular body and gradually diminishing in thickness from its rear to its forward edges, and a cam block for movement in said slot, projecting from the convex side of the wedge plate with the high end of the cam block arranged at the rear edge of the wedge plate.

7. An electric conduit connecter including a sleeve portion having an annular external flange intermediate its ends forming inner and outer sleeve portions, said inner sleeve portion being externally threaded for receiving a lock nut, and said outer sleeve portion being provided with a segmental circumferentially extending slot having a cam surface at one end thereof, a lug formed externally on the outer sleeve portion at that end of the slot having the cam surface, and a clamping member including an arcuate wedge plate arranged within the sleeve and a cam block intermediate the ends of the wedge plate and projecting thru said slot beyond the circumference of the sleeve portion and having a cam face engageable with the cam surface at the end of said slot.

TONY F. SOVINE.